Figure 1:
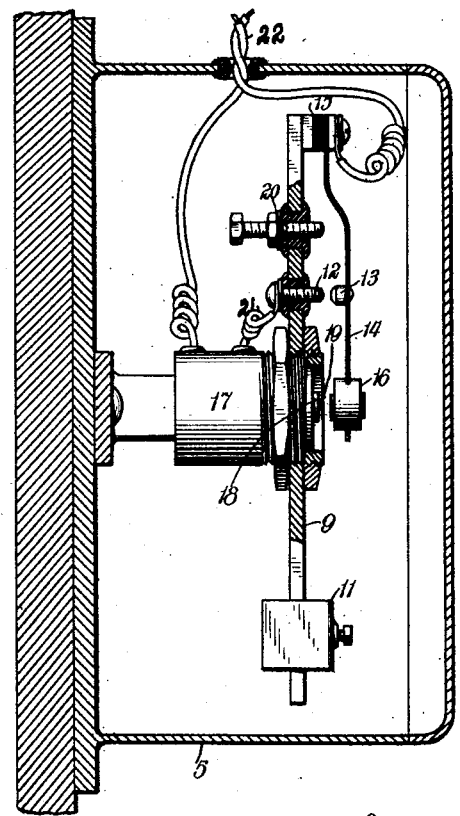

H. J. MURRAY.
ELECTRIC CIRCUIT CONTROL.
APPLICATION FILED JULY 15, 1919.

1,400,229.

Patented Dec. 13, 1921.

INVENTOR
Howard J. Murray
BY
Warren S. Orton.
ATTORNEY

UNITED STATES PATENT OFFICE.

HOWARD J. MURRAY, OF BROOKLYN, NEW YORK.

ELECTRIC-CIRCUIT CONTROL.

1,400,229.  Specification of Letters Patent.  Patented Dec. 13, 1921.

Application filed July 15, 1919. Serial No. 311,067.

*To all whom it may concern:*

Be it known that I, HOWARD J. MURRAY, a citizen of the United States, and a resident of the borough of Brooklyn, county of Kings, and State of New York, have invented certain new and useful Improvements in Electric-Circuit Controls, of which the following is a specification.

The invention relates to an electric circuit control and constitutes a development of the subject matter disclosed in my Patent No. 1,288,128, December 17, 1918.

In the patented disclosure a circuit was controlled by an inertia controlled member, such as a swinging pendulum which when mounted on a vehicle, oscillated by variation in speed of the vehicle. It was found, however, that such a device was also influenced by the inclination or tilting of the vehicle as it moved up and down hills. The tilt of the vehicle frequently was sufficient to cause the pendulum to close the circuit and thus actuate the devices controlled thereby under conditions in which it was not desired that the devices function.

Accordingly, the primary object of the invention is to provide a simple means for automatically controlling an electric circuit by inertia forces which are due solely to changes in horizontal movement of the body to which the device is attached and which means will be substantially uninfluenced by vertical movements of said body.

This object is attained broadly by mounting the electric contacts and the locking mechanism therefor in a rocking frame pivotally mounted to the body for freedom of rotation about a horizontal axis so that the member carrying the movable element of the contacts will be maintained in position unaffected by angular changes in the supporting body.

In the patent above identified it was suggested that one use to which the device might be put was to control a signaling device, and in this disclosure it is suggested that an electrically actuated burglar alarm be included in the circuit. The difference in the two disclosures will depend primarily upon the sensitiveness of operation of the inertia controlled movable member. In a signaling device it is not desired that it actuate on every small quiver and slight change in speed of the vehicle, but, on the contrary, it is desired that the alarm be sounded, and continue to sound, after even a slight jar or small change in speed, to thus defeat any possibility of the burglar quietly moving the car with a slight acceleration in speed.

The invention therefore contemplates a manually actuated control for affecting the sensitiveness of the inertia controlled movable member so that the same organization of parts may be utilized selectively to actuate different types of instruments.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 2:
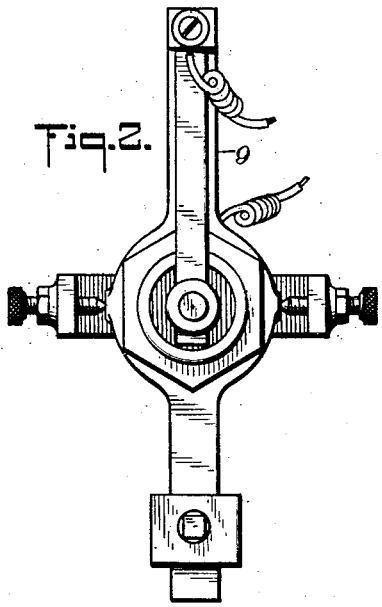
Figure 3:
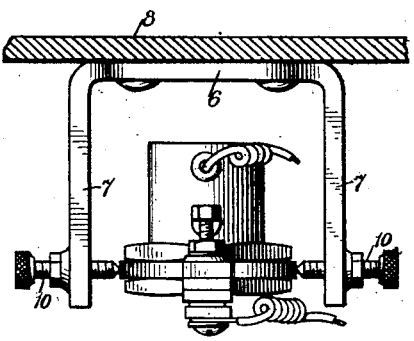

Figure 1 is a vertical sectional view through a mechanism-containing casing inclosing a preferred embodiment of the invention, with parts thereof broken away to show details of the construction; and Figs. 2 and 3 are detailed views respectively of the rear and top of the mechanism shown in Fig. 1.

In the drawings, the parts are shown to be housed within a casing 5 preferably in the form of a locked box designed to prevent access to the parts by unauthorized parties. The casing 5 constitutes a support for a U-bracket 6 the opposite arms 7 of which extend horizontally from the rear wall 8 of the casing. An upstanding rocking frame 9 is pivotally supported between the arms 7 on journaling screws 10 arranged so that the frame has freedom of movement about a horizontal axis disposed substantially at the center of gravity of the frame. The lower part of the frame is provided with a weight 11 slidably mounted thereon to change the center of gravity of the frame. It will be understood that the center of gravity of the rocking frame will be below its axis of rotation so as to maintain the frame in its normal upright position. However, a heavily weighted frame when mounted on a vehicle is apt to acquire a pendulous action and therefore it is desirable under some conditions to raise the center of gravity toward the axis of swing defined by the screws 10.

A relatively stationary contact 12 is fixedly mounted on the frame and a movable contact 13 is disposed to complete the circuit and actuate any device controlled thereby. The second contact is mounted for free movement toward its coacting contact in the direction paralleling the direction of travel of the vehicle as indicated by the arrow in Fig. 1. The movable contact is mounted upon a pendulum 14 fulcrumed in a fixed support 15 constituting a lateral extension from the upper end of the rocking frame. The pendulum is weighted by means of a weight 16 movable along the length of the pendulum to provide any necessary adjustment and having a frictionally tight fit on the pendulum.

The pendulum is provided with an electromagnet 17 having a core 18 with its active end 19 disposed at the axis of rotation of the rocking frame. The weight 16 constitutes an armature for the electromagnet and the parts are so disposed that the closing of the circuit through the contacts 12 and 13 will energize the electromagnet and cause its core to attract and hold the armature.

For the purpose of varying the effective length of the pendulum and thus varying its resistance to swing freely, a set screw 20 is threaded through the frame to engage the pendulum between the fulcrum and the contact 13. The fixed contact 12 is connected to one side of the electromagnet 17 by means of a conductor 21. Main conductors 22 lead into the casing to the opposite side of the electromagnet and to the upper end of the pendulum.

In operation and assuming, for illustration, that the device disclosed is mounted on a vehicle and in circuit with a burglar alarm or some such device, the operator on leaving the vehicle will close the circuit through a switch such as the magneto key, it being understood that the magneto may be shut off simultaneously with the opening of the burglar circuit. Any movement or jar of the vehicle will cause the pendulum to swing into its circuit closing position and the circuit will be closed through the conductors 15 and thus actuate the alarm or other device designed to be so actuated. The contacts will be locked in their circuit closing position by the electromagnet thus causing the alarm to sound or the device to function until the circuit is intentionally broken.

When it is desired to use the control as part of a signaling or other device in which sensitiveness of operation is not desired or is objectionable, the screw 20 will usually be advanced from the position shown in Fig. 1 until it touches the pendulum thus shortening the effective swing and causing the pendulum to become stiff.

The device will then respond to accelerations or retardation of the vehicle only when the acceleration is of considerable magnitude. A sudden slowing down in speed for instance will cause the pendulum to swing under its own inertia into position to cause the contacts 12 and 13 to be held by the electromagnet. In the alternative, a sudden acceleration of the vehicle will be sufficient to cause the pendulum to break away from the electromagnet and thus break the circuit.

Having thus described my invention, I claim:—

1. In a device of the class described, a support which may be subject to movement in space, a rocking member pivotally mounted on said support for oscillatory movement about an axis fixed relative to the support, a relatively fixed contact carried by said rocking member and bodily movable therewith, a second contact supported by said member to move bodily therewith and additionally movable under the force of its inertia into position to affect its circuit closing relation with said fixed contact and means acting on the movable contact for affecting its circuit closing relation with the fixed contact.

2. In a device of the class described, a support which may be subject to movement in space, a rocking member pivotally mounted on said support for oscillatory movement about an axis fixed relative to the support, a relatively fixed contact carried by said rocking member and bodily movable therewith, a second contact supported by said member to move bodily therewith and additionally movable under the force of its inertia into position to affect its circuit closing relation with said fixed contact and adjustable means acting on said rocking member for shifting its center of gravity relative to its center of oscillation.

3. In a device of the class described, the combination of a support, a rocking member pivotally mounted on said support to swing about a horizontal axis, a pendulum fulcrumed to said member above said axis and having its center of gravity disposed adjacent a horizontal line passing through said axis and a circuit closer operatively connected to said pendulum to be affected by the swing thereof under the force of inertia in said pendulum.

4. In a device of the class described the combination of a support, a rocking member pivotally mounted on said support to swing about a horizontal axis, a pendulum fulcrumed to said member above said axis and having its center of gravity disposed adjacent a horizontal line passing through said axis and a circuit closer operatively connected to said pendulum to be affected by the swing thereof under the force of inertia in said pendulum and a weight adjustably mounted on said rocking member to effect its center of gravity.

5. In a device of the class described, the combination of a support, a rocking member pivotally mounted on said support for oscillatory movement about an axis fixed relative to the support, an electromagnet carried by said member and having a core positioned adjacent said axis thereby to position the core substantially in fixed position relative to the support and independent of the swinging movement of the rocking member, a relatively fixed contact in circuit with said electromagnet, a second contact movable under the force of its inertia to close the circuit through said fixed contact and thus through the electromagnet and an armature carried by said second contact and adapted to be held by the electromagnet thereby to hold the contacts electromagnetically in circuit closing position.

6. In a vehicle, an organization of elements constituting an electric circuit for affecting mechanism controlled thereby and including a circuit closer having a movable contact responsive automatically to changes in speed of the vehicle, means pivotally mounting the circuit closer on the vehicle for free oscillatory movement about a horizontal axis whereby the position of the circuit closer in space will be substantially unaffected by changes in the inclination of the vehicle and means controlled by the movable contact for locking the circuit closer in position to continue the actuation of said mechanism.

7. In a vehicle, the combination of a pair of electric conductors, a circuit closer for electrically connecting said conductors, means for mounting said circuit closer on the vehicle for swinging movement about a horizontal axis thereby to be free of any influence on the circuit closer due to movements of the vehicle, in directions having vertical components, means operatively associated with the circuit closer for moving the same into closed position under the influence of changes in speed of the vehicle while moving in a horizontal direction and means controlled by the movement of the circuit closer into its circuit closing position for maintaining the said mechanism active independently of succeeding changes in speed of the vehicle.

8. In a vehicle, the combination of a circuit closer, pivotal means for mounting said circuit closer on the vehicle free of any influence on the circuit closer due to inclination of the vehicle, means operatively associated with the circuit closer for moving the same into closed position under the influence of changes in speed of the vehicle and electromagnetically actuated means in circuit with said circuit closer and operatively associated with the movable element of the circuit closer for maintaining the circuit in closed condition.

9. In a device of the class described, the combination of a support, a rocking frame mounted thereon for free rotary movement, a contact carried thereby, a pendulum hung from said frame, a coacting contact carried by the pendulum and means acting on the pendulum for varying the sensitiveness of the pendulum to respond to forces which cause the pendulum to swing.

10. In a device of the class described, the combination of a support, a rocking frame mounted thereon, a contact carried thereby, a pendulum fulcrumed to said frame, and provided with a coacting contact and a set screw carried by the frame and adapted to engage the pendulum to vary its sensitiveness to swing.

Signed at New York city, in the county of New York and State of New York this 10th day of July, A. D. 1919.

HOWARD J. MURRAY.